Figure 8:
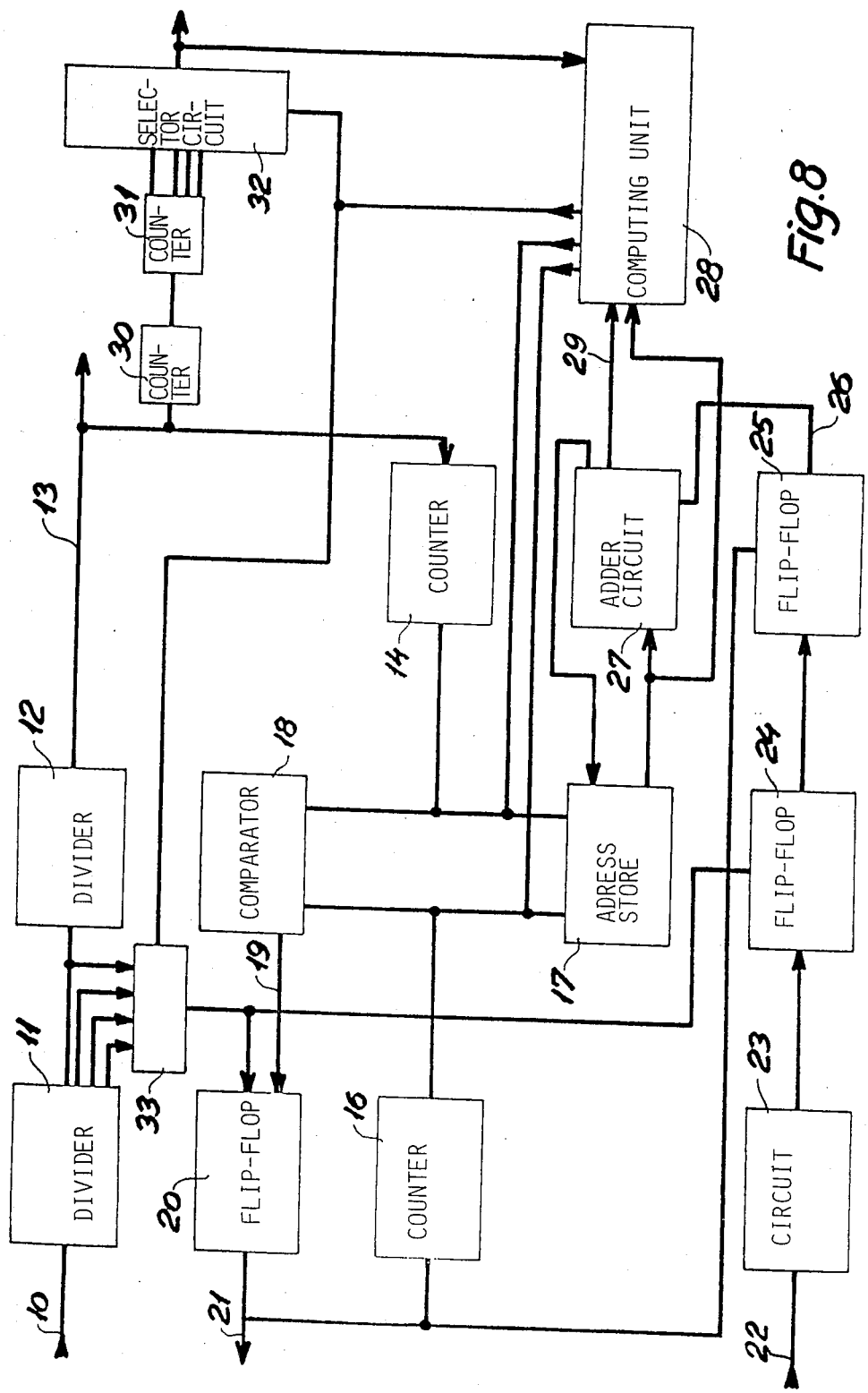

United States Patent [19]
Andersen

[11] Patent Number: 4,816,669
[45] Date of Patent: Mar. 28, 1989

[54] PROCESS FOR SIGNAL PROCESSING OF REFLECTED PULSES AND AN APPARATUS FOR PERFORMING THE PROCESS

[75] Inventor: Ole R. Andersen, Brønshøj, Denmark

[73] Assignee: Aktieselskabet Nordiske Kabelog Traadfabriker, Frederiksberg, Denmark

[21] Appl. No.: 64,306
[22] PCT Filed: Sep. 8, 1986
[86] PCT No.: PCT/DK86/00100
§ 371 Date: Jun. 4, 1987
§ 102(e) Date: Jun. 4, 1987
[87] PCT Pub. No.: WO87/01462
PCT Pub. Date: Mar. 12, 1987

[30] Foreign Application Priority Data
Sep. 6, 1985 [DK] Denmark .................... 4072/85

[51] Int. Cl.$^4$ ............................................. H01J 5/16
[52] U.S. Cl. ................................. 250/227; 356/73.1
[58] Field of Search ............... 250/227; 356/5, 73.1

[56] References Cited
U.S. PATENT DOCUMENTS

| | | | |
|---|---|---|---|
| 3,900,261 | 8/1975 | Wingate | 356/5 |
| 3,981,592 | 9/1976 | Williams | 250/227 |
| 4,344,705 | 8/1982 | Kompa et al. | 356/5 |

Primary Examiner—David C. Nelms
Attorney, Agent, or Firm—Ladas & Parry

[57] ABSTRACT

When examining optical fibers it may be of interest to determine the location of a reflection point along the fiber. A process for time localization of reflected pulses is described, at least two reflected pulses being received, the first one of which originates from a predetermined reference point, the second one from a reflection point whose position is to be determined. According to the described process, the location of the reflection point along the fiber is determined roughly, and then a relatively narrow sampling window is laid around the roughly determined position. The sampling process is hereby concentrated around the reflected signal to provide for optimum utilization of the signal processing time for fine localization of the pulse. Also an apparatus for performing the process is described.

6 Claims, 3 Drawing Sheets

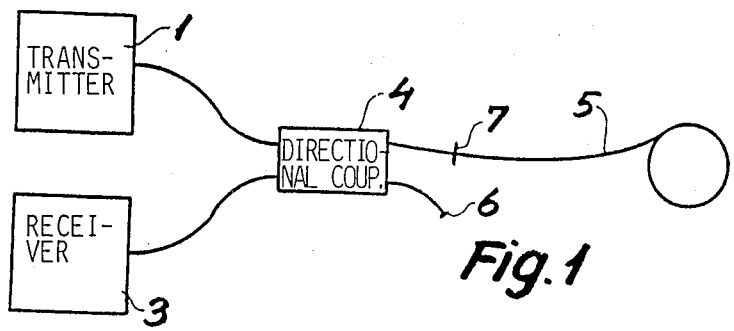
Fig.1
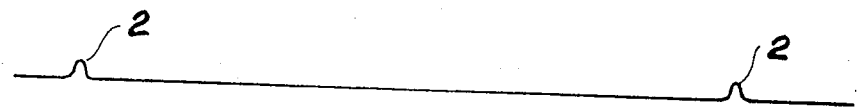
Fig.2a
Fig.2b
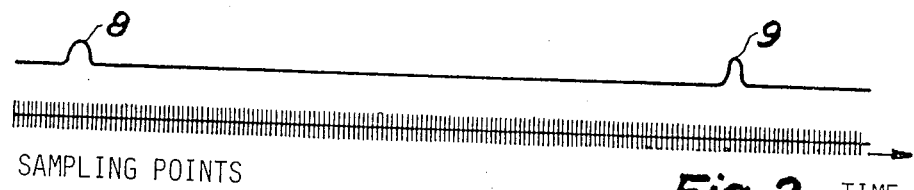
SAMPLING POINTS
Fig.3  TIME
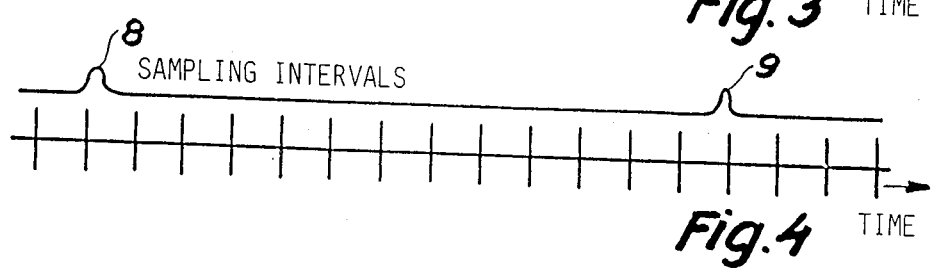
SAMPLING INTERVALS
Fig.4  TIME

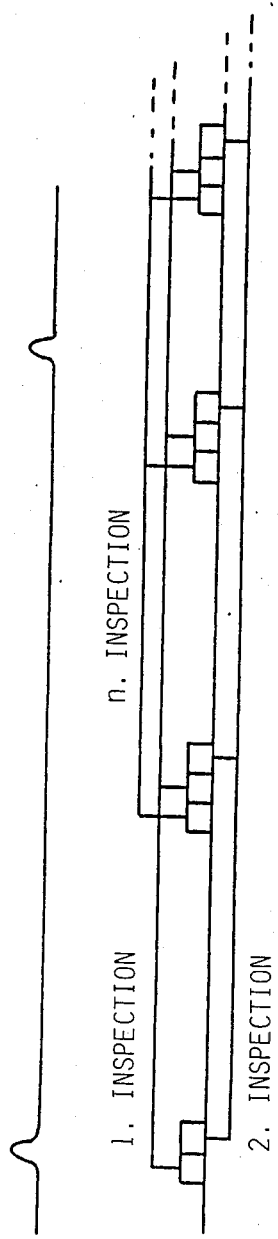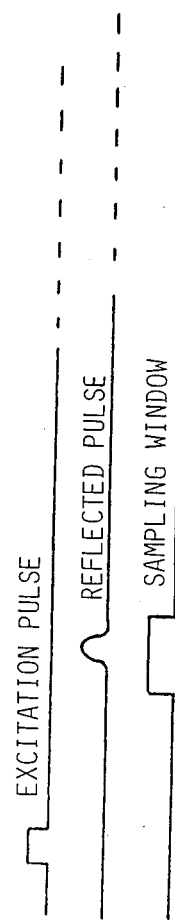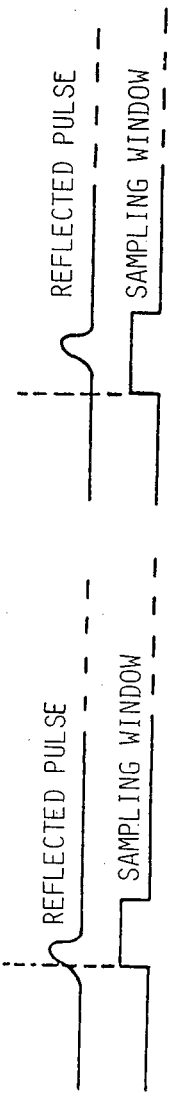

PROCESS FOR SIGNAL PROCESSING OF REFLECTED PULSES AND AN APPARATUS FOR PERFORMING THE PROCESS

The invention concerns a process for signal processing of reflected pulses for time localization of these, in particular in connection with reflection measurements where at least two reflected pulses are received, the first one of which originates from a predetermined reference point, the second one from a reflection point whose position is to be determined.

The said reflection point may be indicative of a rupture of a optical fibre, but may also be indicative of the end of the fibre, accurate determination of the length of optical fibres being important in connection with monitoring of the stress to which an optical fibre may be subjected in connection with cabling, winding of cables on drums, laying in the field or mechanical influences. Further, measurements of lengths and changes in the length are extensively used by fibre manufacturers when manufacturing the optical fibres and optical cables.

The above-mentioned measurements have previously been performed by transmitting a plurality of light impulses in the optical fibre and then measuring the time lag between transmission of a pulse and reception of the associated reflected pulse.

The Norwegian Published Application No. 143 117 discloses a process for rough or fine determination of a reflection point on a transmission line. The location of the reflection point is determined by comparing the propagation time of a pulse on the transmission line under examination with the propagation time of a simultaneously transmitted pulse on a delay line.

In this process the entire transmission line is scanned in juxtaposed measuring intervals until the transmission line has been scanned along its entire length. This requires transmission of a large number of measuring pulses, which causes an examination according to this process to be very slow.

The object of the invention is to provide a process of the above-mentioned type, which enables significantly faster positional determination of the reflection point than was possible in the past.

This object is achieved by performing the process in which each measurement in a plurality of measurements comprises transmission of a pulse and examination of reflections of said pulse within two or more measuring intervals associated with the measurement and evenly spaced along the signal propagation path. The improved rate is obtained in that information can be received from several intervals during a single scan, which involves a reduction in the signal processing time, while permitting the use of slower and thus more inexpensive components in the apparatus used for performing the process.

To obtain a positional determination as accurate as possible, it is important that the entire reflected pulse constitutes to the measurement, and the process is accordingly preferably performed in a process in which the positons of the intervals are shiftable, and that the positions are shifted if a reflection point is close to the borderline between two adjacent intervals.

The invention also concerns an apparatus for performing the process and of the type in which the apparatus comprises means for providing measurement pulses in response to a clock pulse signal, means for detection of pulses reflected from the propagation path, means for computing the time distance between a reflection point and a reference point and a store with a predetermined number of store locations corresponding to a plurality of detection intervals along the propagation path. The apparatus is characterized by the necessary and sufficient features to perform the process in which a store with a number of store cells each of which corresponds to a specific detection interval along the propagation path and having the detection means designed to store a signal in precisely the store cell which corresponds to the detection interval in which a reflective pulse is detected and including means scanning the store, said means being designed to initiate signal processing of the reflected signal in the interval which corresponds to a store cell with a predetermined content, the adjacent intervals used for the rough determination being represented by addresses in the said store.

The invention will be explained more fully by the following description of a preferred embodiment with reference to the drawing, in which FIG. 1 is a sketch of the measurement set-up used in the performance of the process of the invention, FIGS. 2a and 2b are schematic views of the signal flow in the transmitter and receiver shown in FIG. 1, FIG. 3 is a schematic representation of the known sampling of the signals shown in FIG. 2b, FIG. 4 shows schematically how the propagation path is divided into sampling intervals, FIG. 5 shows schematically how the signal of FIG. 2b is positionally determined with a view to laying out a sampling window, FIG. 6 shows how a sampling window has been laid around a reflected pulse, FIG. 7 shows how a sampling window is shifted until it surrounds a reflected pulse, and FIG. 8 is a block diagram of a preferred embodiment of the part of the receiver from FIG. 1 where the sampling intervals are determined and shifted along the propagation path, and where the sampling window is provided in dependence upon the positional determination of the reflected pulses.

FIG. 1 shows the principle of the measurement set-up in the performance of the process of the invention. A transmitter 1 transmits pulses 2 which are transferred to a directional coupler 4. The directional coupler 4 is connected to a propagation path 5 by a cut face 7. The other ports of the directional coupler are connected to a receiver 3 and a termination 6, which is reflection-free. According to a preferred use of the process and a preferred embodiment of the present invention, the transmitter transmits optical pulses, and the propagation path is an optical fibre, and the set-up shown in FIG. 1 is then a reflectometer known per se.

FIG. 2a shows the signal from the transmitter 1, said signal being composed of a plurality of pulses 2. FIG. 2b shows the signal transferred to the receiver 3. This signal contains a plurality of pulses which are partial reflections of the pulses generated by the transmitter, the pulse 8 originates from reflections at the junction between the directional coupler and the propagation path, and the reflection 9 originates from the one of the propagation path end faces which is not connected to the directional coupler 4.

FIG. 2b shows a simplified case, it being assumed that reflections occur from only two points on the propagation path. If other discontinuities are present in the propagation path, then reflections will also occur from these.

It is of great interest to determine the locations of the reflection sources in a propagation path. With a view to determining the locations of the reflection sources in or their movements on the propagation path, it is necessary to know the transit time of the pulses, i.e. the time the propagation takes to the reflection point and back, with great accuracy.

A known method of providing this exact knowledge of the transit time comprises sampling the signal arriving at the receiver for such a long period of time and with so great density as to make it certain that all reflections are recognized and positionally determined. If this sampling is to give useful results, sampling is required for a long period of time. If e.g. the propagation path is 16 km, and the pulses are assumed to propagate at the velocity of light, then sampling will take about 7 minutes just to determine the positions of the reflections.

The present invention is based on the finding that the method outlined above produces a far too large amount of data which does not contain any information. Therefore, according to the present invention, steps are taken to reduce this large amount of data with a view to reducing the measuring time, while maintaining the measurement accuracy.

FIG. 3 shows schematically how sampling is performed according to the prior art over the entire propagation path in order to determine both the positions and shapes of the reflections. It appears from this that a large number of samplings does not contain data.

FIG. 4 shows schematically how, according to the process of the invention, the propagation path is divided into a plurality of sampling intervals each of which may contain a reflected pulse. According to the invention, each of these intervals is first scanned to establish whether a pulse is present in the interval or not. When it has thus been established in which sampling intervals a pulse is present, then the individual pulses are sampled, but only in the intervals known to contain pulses. Thus, the data amount is reduced significantly, and thereby the time spent on collection of data.

To increase the data collection rate additionally, the establishment of which sampling intervals contain pulses is effected by scanning the propagation path in such a manner that a plurality of sampling intervals is scanned each time an excitation pulse is applied to the propagation path.

FIG. 5 shows schematically how the sampling interval examined at a given point of time "jumps" with a predetermined number of sampling intervals along the propagation path. By shifting the first sampling interval which is being examined by one sampling interval and repeating the process until all the sampling intervals have been examined, the propagation path is scanned very rapidly. This is an essential advantage since it is necessary to examine the entire propagation path a large number of times and to sum up the examination result for each individual sampling interval with a view to catching pulses which would otherwise be concealed by noise. When it has been determined in the manner described above which sampling intervals contain pulses, then a sampling window is laid in the sampling intervals of interest. Normally, no sampling interval is determined for the pulse resulting from the reflection at the junction between the directional coupler 4 and the propagation path 5, since the distance to this point is known in advance, and this distance does not change since it is determined by the physical dimensions of the measurement set-up.

FIG. 6 shows how a sampling window is laid around a reflected pulse. In the example shown, the reflected pulse is entirely contained in the sampling window. Where the reflected pulse is not positionally determined with sufficient accuracy, i.e. the pulse is partly outside the sampling window, the sampling window is shifted, as appears from FIG. 7, in such a manner that the sampling window surrounds the pulse completely.

When the sampling window has been laid so that it surrounds the pulse completely, then the pulse is sampled in the usual manner. If more than one reflected pulse is localized by the initial scan of the propagation path, a sampling window may be laid around each individual reflected pulse.

The data resulting from the sampling of the pulses are used for calculating the "centres of gravity" of the pulses. The transit time of the pulses is then calculated as the transit time of their "centres of gravity". The difference between the transit times of the pulses is then calculated as the difference between the "centre of gravity" transit time of the pulses.

FIG. 8 shows a preferred embodiment of the part of the receiver 2 which scans the propagation path of reflected pulses and lays the sampling window/windows. The circuit receives on an input 10 a 100 Mhz clock pulse signal which is transferred to a four-phase divider circuit 11. This divider circuit produces four phase-shifted output signals whose frequency is 25 Mhz. One of these output signals is fed to a binary divider 12 whose dividing proportion is $2^{12}$. The output signal from this dividing circuit is a 6.10 Khz clock pulse signal 13 which is used as an activation signal for the provision of excitation pulses.

The activation signal is fed to a 5 bit counter 14. Another counter 16 is activated by the output signal 19 of a comparator 18 which is synchronized with one of the output signals of the counter 11 in a flip-flop 20. The output signal from the counter 14 is used as least significant bits in the address for a random access store 17, and is also fed to the comparator 18 as the least significant bits. The output signals from the counter 16 are used as the most significant bits in the address to the store 17 and are fed to the comparator 18 as the most significant bits.

The comparator 18 is also connected to the counter 12 and compares the state of the counter with the signals from the counters 16 and 14. In case of consistency between the output signals from the counters and the counter state in the counter 12, the comparator 18 provides an output signal to the line 19. This output signal is transferred together with the clock pulse to a flip-flop 20 which produces on its output a signal 21 indicative of a sampling window.

The signal from a circuit (not shown), designed to detect the pulses received from the propagation path, is applied to the input 22. These signals are transferred to a threshold circuit 23 determining whether the signal on the input 22 indicates detection of a pulse. The output signal from the circuit 23 is transferred to a flip-flop 24 which is controlled by the same clock pulse signal as the flip-flop 20. This causes synchronization of the pulse produced by the circuit 23 with the pulses from the flip-flop 20 indicating window positions, so that the detected pulses are hereby attached to a sampling window.

The signal on the output of the flip-flop 24 is stored when the signal 21 is activated in a flip-flop 25. The output 26 of the flip-flop 25 is connected to the least significant bits of an adder circuit 27. The adder circuit receives on its other inputs the content of the store cell which is addressed by the counters 14 and 16, said address corresponding to the actual sampling interval under examination.

The signal from the flip-flop 25 is added to the content in the mentioned store address, and the result is read back into the store 17.

When the adder 27 gives overflow, i.e. the content in the addressed store cell has exceeded the possible maximum value, a signal is transferred over a line 29 to a computing unit 28.

The computing unit 28 takes over the further control of the functions of the apparatus after signalling of store overflow. The address corresponding to a sampling window is determined by scanning the store 17 and determining which cell or cells contain a numerical value which is greater than a predetermined threshold value. The address of this store cell or cells then corresponds to the position of one or more sampling windows.

The shifted scan of the propagation path occurs when the counter 16 receives the output signal from the comparator 18. When the input signals to the comparator 18 and the state of the counter 12 agree, then the counter counts "1" up, thereby changing the input signal to the comparator 18, and the output signal 19 occurs the next time in the state of the counter 12, and the input signals to the comparator 18 are identical. Each count of the counter 16 gives a great jump in the address to the store 27 and the comparator 18, since the counter 16 indicates the most significant bits in the address to the circuits 18 and 27. The count of the counter 14, on the other hand, only results in a small shift in the jumps produced by the counter 16, since the counter 14 only indicates the least significant bits of the address.

When the computing unit 28 has determined which store addresses contain pulses, these addresses are transferred successively to the comparator 18, which then produces an output signal 19 when there is consistency between the counter 12 and the address read out of the computing unit 28, said address referring to a sampling interval. When a signal 19 is provided, it is transferred to the output 21 indicating the sampling window. The signal 21 is transferred when a 25 Mhz clock pulse is provided.

The sampling function is controlled in that a reference signal is produced, said signal indicating the starting point of time of a 40 nsec. sampling window. This reference signal is produced by dividing a 6.10 Khz clock pulse signal in counters 30 and 31.

The counter 31 is a four-phase counter, and the four output signals of the counter 31 are transferred to a selector circuit 32 whose output signal is used as a reference for the sampling.

The leading edge of the reference signal indicates the beginning of a 40 nsec. sampling window, and the signal reflected from the fibre is sampled with this leading edge as a time reference. If it is detected that the reflected pulse is not sufficiently surrounded by the sampling window, the computing unit controls shifting of the sampling window by shifting the leading edge of the pulse 21 indicating the sampling window and the leading edge of the reference signal (the output signal from the circuit 32) indicating the beginning of the sampling interval.

This shift is produced in that the computing unit 28 controls the selector circuit 32 and a selector circuit 33 and optionally changes the address fed to the comparator 18. The selector circuit 32 selects one of the four phases of the counter 31, and the selector circuit 33 selects one of the corresponding four phases of the counter 11. The sampling window and the starting point of time are thus shifted simultaneously, and it is examined again whether the pulse is surrounded by the sampling window. If the pulse is surrounded, then sampling begins, otherwise another oscillator phase is selected, and the address to the comparator 18 is optionally changed again. Then it is examined again whether the pulse is surrounded by the sampling window. This iterative process continues until it has been detected that the pulse is surrounded by the sampling window.

I claim:

1. A process for signal processing of reflected pulses for time localization of these, in particular in connection with reflection measurements with a view of positional determination of reflection points along a signal propagation path, said reflection points being determined by a plurality of measurements with relatively great unreliability in a plurality of measurement intervals and then determined with great reliability in a single measurement interval on the basis of repetitive reflection measurements where a reflection point is associated with a measurement interval, in which each measurement in said plurality of measurements comprises transmission of a pulse and examination of reflections of said pulse within two or more measuring intervals associated with the measurement and evenly spaced along the signal propagation path.

2. A process according to claim 1, wherein the positions of the intervals are shiftable, and that the positions are shifted if a reflection point is close to the borderline between two adjacent intervals.

3. An apparatus for determination of the locations of reflection points along a pulse propagation path (5), said apparatus comprising means (1) for providing measuring pulses in response to a clock pulse signal, means (3) for detection of pulses reflected from the propagation path (5), means for computing the time distance between a reflection point and a reference point (7), and a store (17) with a predetermined number of store locations corresponding to a plurality of detection intervals along the propagation path comprising a store (17) with a number of store cells each of which corresponds to a specific detection interval along the propagation path, and that the detection means (23, 24, 25) are designed to store a signal in precisely the store cell which corresponds to the detection interval in which a reflected pulse is detected, and by means for scanning the store (28), said means being designed to initiate signal processing of the reflected signal in the interval which corresponds to a store cell with a predetermined content.

4. An apparatus according to claim 3, comprising a first counter (16) and a second counter (14) to produce the addresses of the intervals, said first counter (16) receiving the clock pulse signal to produce the most significant part of the address, said second counter (14) receiving the clock pulse signal to determine the least significant part of the address, said detector means (23, 24, 25) changing the entire address.

5. An apparatus according to claim 4, wherein said signal processing comprises sampling of the reflected signals in a detection interval, and by phase shift means (33) for mutual shifting of associated detection windows and detection intervals.

6. An apparatus according to claim 5, comprising means (28, 30-32) to determine the position of a reflected pulse with respect to the borderline between two adjacent intervals, said means controlling the phase shift means (33).

* * * * *